(12) United States Patent
Yan et al.

(10) Patent No.: US 11,618,095 B2
(45) Date of Patent: Apr. 4, 2023

(54) ROTATING ARC SENSOR

(71) Applicant: Guoqing Yan, Tangshan (CN)

(72) Inventors: Guoqing Yan, Tangshan (CN); Zongyi Yan, Tangshan (CN)

(73) Assignee: Guoqing Yan, Tangshan (CN)

( * ) Notice: Subject to any disclaimer, the term of this patent is extended or adjusted under 35 U.S.C. 154(b) by 106 days.

(21) Appl. No.: 17/288,004

(22) PCT Filed: Jan. 30, 2019

(86) PCT No.: PCT/CN2019/073817
§ 371 (c)(1),
(2) Date: Apr. 23, 2021

(87) PCT Pub. No.: WO2020/147151
PCT Pub. Date: Jul. 23, 2020

(65) Prior Publication Data
US 2021/0379684 A1    Dec. 9, 2021

(30) Foreign Application Priority Data

Jan. 18, 2019    (CN) .......................... 201910056147.5

(51) Int. Cl.
*B23K 37/02*        (2006.01)
*B23K 9/022*        (2006.01)
(Continued)

(52) U.S. Cl.
CPC ............ *B23K 9/022* (2013.01); *B23K 9/0956* (2013.01); *B23K 9/30* (2013.01); *B23K 37/0241* (2013.01); *B23K 37/0247* (2013.01)

(58) Field of Classification Search
CPC .......... B23K 9/022; B23K 9/09; B23K 9/095; B23K 9/0956; B23K 9/30; B23K 9/0241;
(Continued)

(56) References Cited

U.S. PATENT DOCUMENTS 3,396,263 A * 8/1968 Even ........................ B23K 9/30
    219/127
4,047,656 A * 9/1977 McCombs ............. B23K 9/133
    228/27
(Continued)

FOREIGN PATENT DOCUMENTS

CN     106041261 A  * 10/2016
CN     106077903 A    11/2016
JP     H04182073 A    6/1992

OTHER PUBLICATIONS

Sang-Kwun Jeong, et al., Development of High Speed Rotating Arc Sensor and Seam Tracking Controller for Welding Robots, ISIE, 2001, pp. 845-850.
(Continued)

*Primary Examiner* — Helena Kosanovic
*Assistant Examiner* — Ayub A Maye
(74) *Attorney, Agent, or Firm* — Bayramoglu Law Offices LLC

(57) ABSTRACT

A rotating arc sensor is provided. The rotating arc sensor includes a motor, a connecting rod for driving a welding gun to perform an annular movement, a sliding assembly for supporting a weight of the connecting rod and supporting a free movement of a first end of the connecting rod, and an eccentric oscillating member for driving a second end of the connecting rod to perform the annular movement, wherein a center of a rotating shaft of the motor is provided with a hollow cavity capable of communicating with both ends of the motor, the sliding assembly is disposed at a top end of the motor, and the first end of the connecting rod protrudes out of the top end of the motor through the hollow cavity and is connected with the sliding assembly. The eccentric oscillating member includes a first flange and a second flange.

9 Claims, 3 Drawing Sheets

(51) Int. Cl.
*B23K 9/095* (2006.01)
*B23K 9/30* (2006.01)

(58) Field of Classification Search
CPC ... B23K 9/0247; B23K 37/02; B23K 37/0247
See application file for complete search history.

(56) References Cited

U.S. PATENT DOCUMENTS

| | | | | |
|---|---|---|---|---|
| 4,538,046 | A * | 8/1985 | Kazlauskas | B23K 9/032 |
| | | | | 219/124.1 |
| 4,728,974 | A * | 3/1988 | Nio | B23K 9/0956 |
| | | | | 396/419 |
| 4,926,023 | A * | 5/1990 | Sugitani | B23Q 1/545 |
| | | | | 219/125.12 |
| 2017/0138761 | A1 * | 5/2017 | Liu | G01D 5/14 |

OTHER PUBLICATIONS

Ye Jian-Xiong, et al., Detection of Welding Torch Inclination based on Rotating Arc Sensor, 2008 International Conference on Intelligent Computation Technology and Automation, 2008, pp. 1025-1028.

* cited by examiner

ROTATING ARC SENSOR

CROSS REFERENCE TO THE RELATED APPLICATIONS

This application is the national stage entry of International Application No. PCT/CN2019/073817, filed on Jan. 30, 2019, which is based upon and claims priority to Chinese Patent Application No. 201910056147.5 filed on Jan. 18, 2019, the entire contents of which are incorporated herein by reference.

TECHNICAL FIELD

Embodiments of the present disclosure relate to the field of automatic welding technology, and in particular to a rotating arc sensor.

BACKGROUND

Automated welding technology using welding sensors for seam tracking is one of the keys to welding automation. Welding sensors can be divided into two major types according to sensing mode: additional sensor and arc sensor, wherein the arc sensor has its unique advantages, and is one of the most active tracking technologies currently in research. The arc sensor is mainly divided into the types including dual-wire parallel arc sensor, oscillating scanning arc sensor and rotating arc sensor, etc. The dual-wire parallel arc sensor has certain difficulties in its implementation due to its complicated structure and process flow, and the application thereof is largely limited. For the oscillating scanning arc sensor, the tracking effect thereof is affected to some extent since the oscillating frequency of the robot is typically below 10 Hz, and the tracking role cannot be realized in high-speed welding and large-arc welding.

The application of the existing rotating scanning arc sensor is mainly that a motor drives a welding gun to perform a conical movement, and the tracking effect is good; however, the structure is complicated, the volume is large, the vibration is large, and the adjustment is inconvenient, thereby limiting the application thereof in practice. The existing solution is to drive the conductive rod of the scanning arc sensor into a conical movement. Although the accessibility is good, the welding gun needs to be built in the arc sensor, which causes the problem of inconvenient maintenance and replacement of the welding gun.

SUMMARY

To this end, embodiments of the present disclosure provide a rotating arc sensor to solve the problem of inconvenient maintenance and replacement of the welding gun caused by the in-building of welding gun in the arc sensor in the conventional technology.

In order to achieve the above object, embodiments of the present disclosure provide the following technical solutions.

A rotating arc sensor including a motor, a connecting rod for driving a welding gun to perform an annular movement, a first assembly for supporting the weight of the connecting rod and supporting a free movement of one end of the connecting rod, and an oscillating member for driving another end of the connecting rod to perform an annular movement, wherein the center of the rotating shaft of the motor is provided with a hollow cavity capable of communicating with both ends of the motor, the first assembly is disposed at a top end of the motor, and one end of the connecting rod protrudes out of the top end of the motor through the hollow cavity and is connected with the first assembly. The oscillating member includes a first flange and a second flange. The first flange is sleeved over the rotating shaft of the motor and rotates with the rotating shaft. The second flange is disposed on the first flange, and the circle center of the second flange is offset from the circle center of the first flange. The other end of the connecting rod extends into the second flange and is connected with the inner wall of the second flange through a bearing assembly. The other end of the connecting rod is provided with a second assembly for connecting with the welding gun;

the first assembly comprises two sets of sliders, two sets of slide rails, a first mounting disc and a second mounting disc, wherein the two sets of sliders are arranged at lower surfaces of the first mounting disc and the second mounting disc respectively in a "cross" shape, the two sets of slide rails are arranged at upper surfaces of the second disc and the top end of the motor respectively in a "cross" shape and cooperate with the two sets of sliders, the first mounting disc is connected with one end of the connecting rod, and the first mounting disc and the second mounting disc are disposed apart from each other in the vertical direction.

The embodiment of the present disclosure is further characterized in that the circle center of the second mounting disc is provided with a circular hole, and a spacing is preset between the circular hole and the connecting rod to enable the free movement of the connecting rod.

The embodiment of the present disclosure is further characterized in that the slider is provided with a "C" shaped opening, and the two sides of the slide rail are provided with grooves, into which both ends of the "C" shaped opening can extend.

The embodiment of the present disclosure is further characterized in that the second flange is adjustably disposed on the first flange.

The embodiment of the present disclosure is further characterized in that a surface of the first flange for contacting the second flange is provided with a groove region, and an end of the second flange is disposed in the groove region and can slide in the groove region along a wall surface of the groove region.

The embodiment of the present disclosure is further characterized in that the groove region is provided with a circular threaded hole for fixing the second flange in cooperation with a bolt, and an end of the second flange is provided with a waist hole corresponding to the circular threaded hole.

The embodiment of the present disclosure is further characterized in that an eccentricity graduated scale is further disposed on the surface of the first flange for contacting the second flange, and an end of the second flange is provided with scribed lines for indicating the current eccentricity.

The embodiment of the present disclosure is further characterized in that the bearing assembly includes a bearing and a bearing sleeve, an inner ring of the bearing is sleeved over another end of the connecting rod, an outer ring of the bearing cooperates with an inner wall of the bearing sleeve through interference fit, and an outer wall of the bearing sleeve cooperates with an inner wall of the second flange through interference fit.

The embodiment of the present disclosure is further characterized in that an end of the rotating shaft is provided with a magnetic ring, the magnetic ring rotates together with the rotating shaft, and the motor is provided with an encoder for reading the rotational data of the magnetic ring.

Embodiments of the present disclosure have the following advantages:

With the rotating arc sensor provided by the embodiments of the present disclosure, the welding gun can be detachably disposed outside the arc sensor on the basis of ensuring the precise movement trajectory of the welding gun, thereby realizing the effect of convenient maintenance and replacement of the welding gun. In addition, since the second flange is adjustably disposed on the first flange, it is also possible to make targeted adjustment to the diameter of the annular path of the welding gun according to different welding requirements.

BRIEF DESCRIPTION OF THE DRAWINGS

The accompanying drawings that are required to be used in the description of the embodiments or the conventional technology are described briefly below, so that the technical solutions according to the embodiments of the present disclosure or according to the conventional technology will become clearer. It is apparent that the accompanying drawings in the following description are only illustrative. For those skilled in the art, other accompanying drawings may be obtained according to these drawings provided, without any creative work.

The structure, proportion, size and the like shown in the present specification are only used to cooperate with the contents disclosed in the specification for those skilled in the art to understand and read, and are not intended to limit the conditions with which the present disclosure can be implemented. Therefore, they have no practical significance in a technical sense. Any modification to the structure, any change of the proportions or any adjustment of the size should fall within the scope covered by the technical contents disclosed in the present disclosure without influencing the effects and objects that can be achieved by the present disclosure.

IN THE DRAWINGS

1: motor; 11: rotating shaft; 111: hollow cavity; 12: magnetic ring; 13: encoder; 14: protective cover;

2: connecting rod; 21: connection flange; 22: clamping member;

3: sliding assembly; 31: slider; 32: slide rail; 33: first mounting disc; 34: second mounting disc; 341: circular hole;

4: eccentric oscillating member; 41: first flange; 411: groove region; 412: circular threaded hole; 42: second flange; 421: waist hole;

5: bearing; 6: bearing sleeve; 61: retainer ring; 7: welding gun; 8: clamping device

DETAILED DESCRIPTION OF THE EMBODIMENTS

The implementations of the present disclosure is described in the specific embodiments below, and other advantages and functions of the present disclosure can be readily understood by those skilled in the art from the contents disclosed in the specification. It is apparent that the described embodiments are part of the embodiments of the present disclosure, instead of all of them. All the other embodiments obtained by those skilled in the art on the basis of the embodiments of the present disclosure without creative efforts will fall within the scope of protection of the present disclosure.

The terms "upper", "lower", "left", "right", "intermediate" used in the specification are merely for the purpose of facilitating description, and are not intended to limit the scope of the present disclosure. The change or adjustment of the relative relationship thereof should be considered as falling within the scope of the present disclosure without substantively changing the technical content.

Embodiment 1

Figure 1:
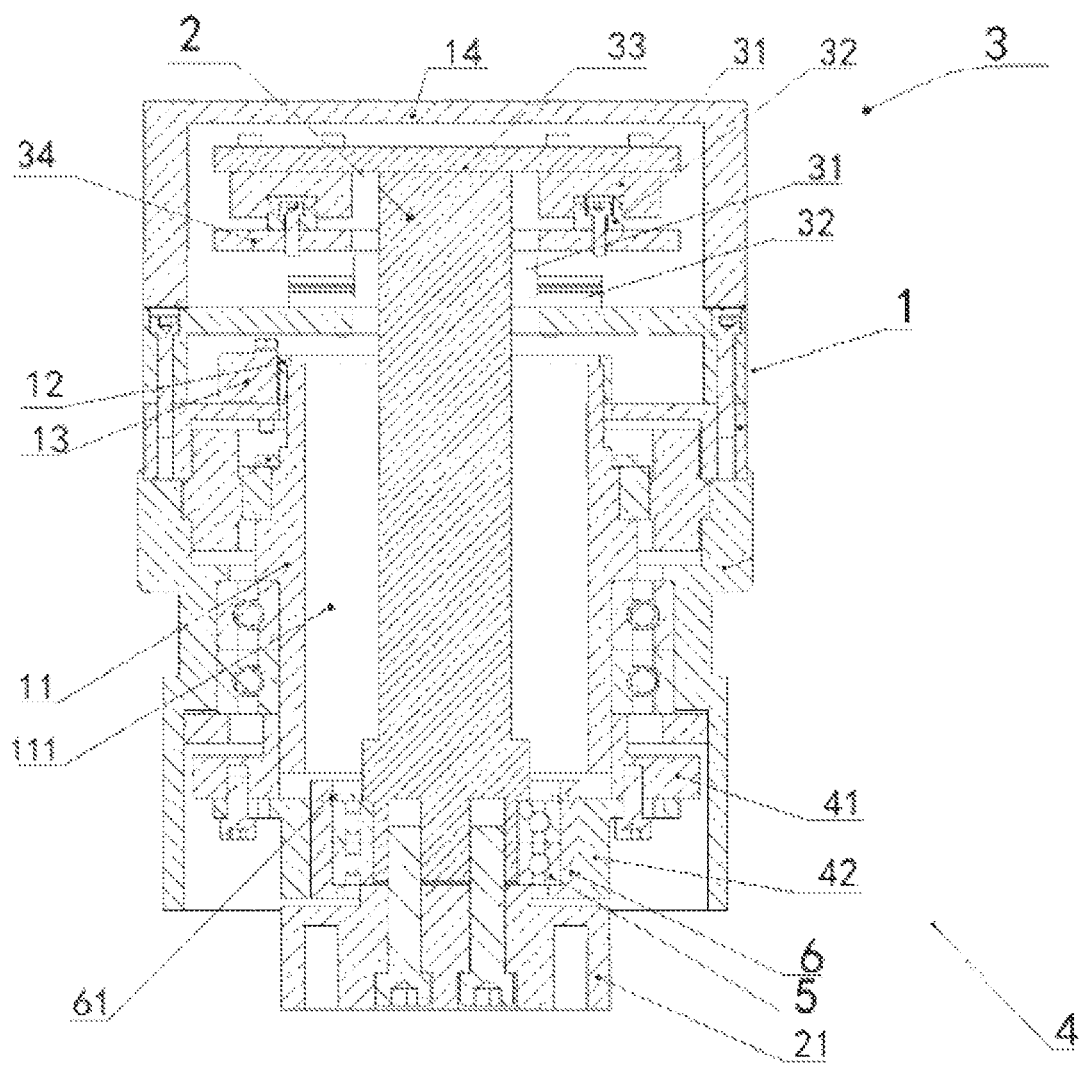
FIG. 1 is a schematic cross-sectional view of the structure of a rotating arc sensor according to Embodiment 1 of the present disclosure.
Figure 2:
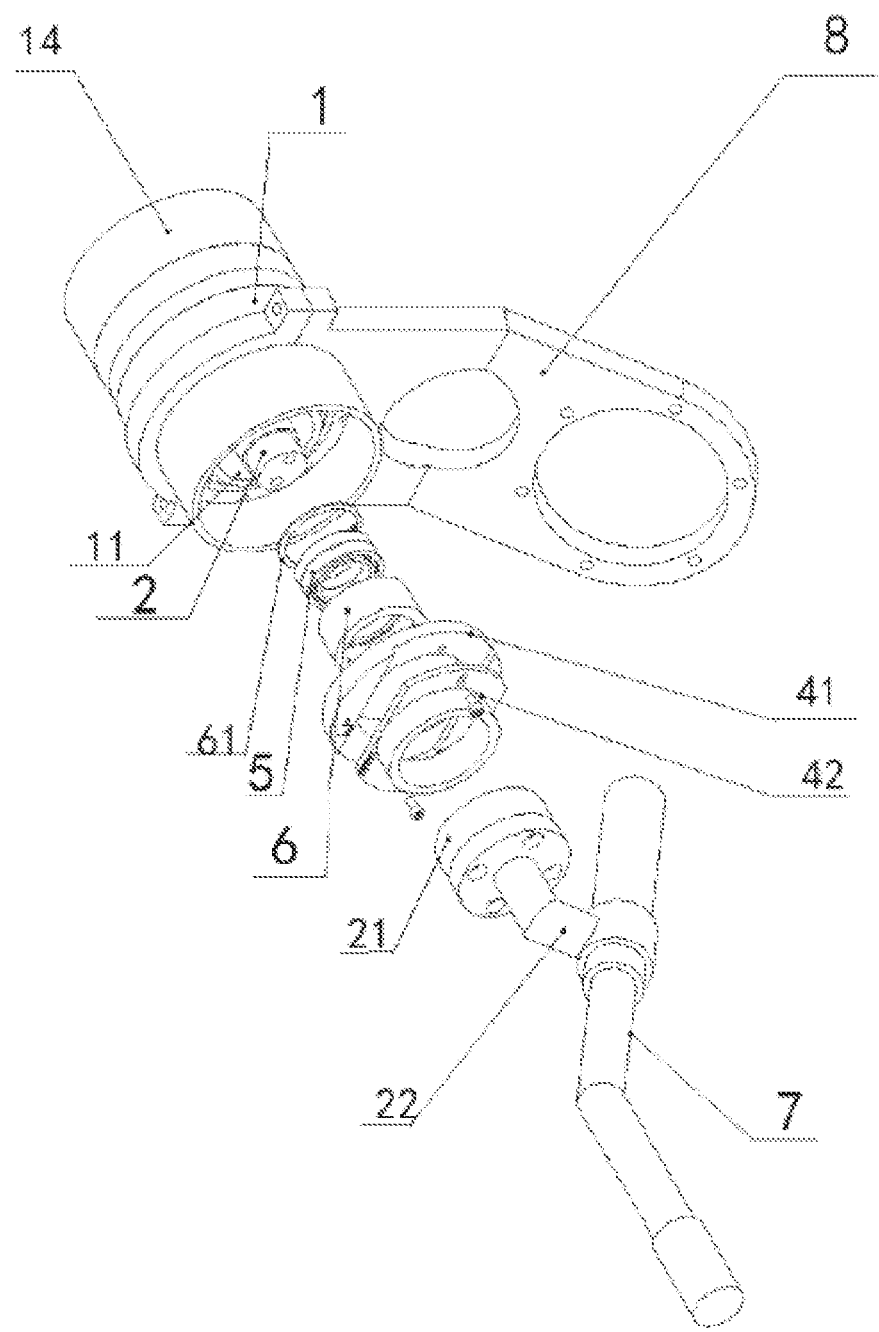
FIG. 2 is a schematic exploded perspective view of the rotating arc sensor according to Embodiment 1 of the present disclosure.
Figure 3:
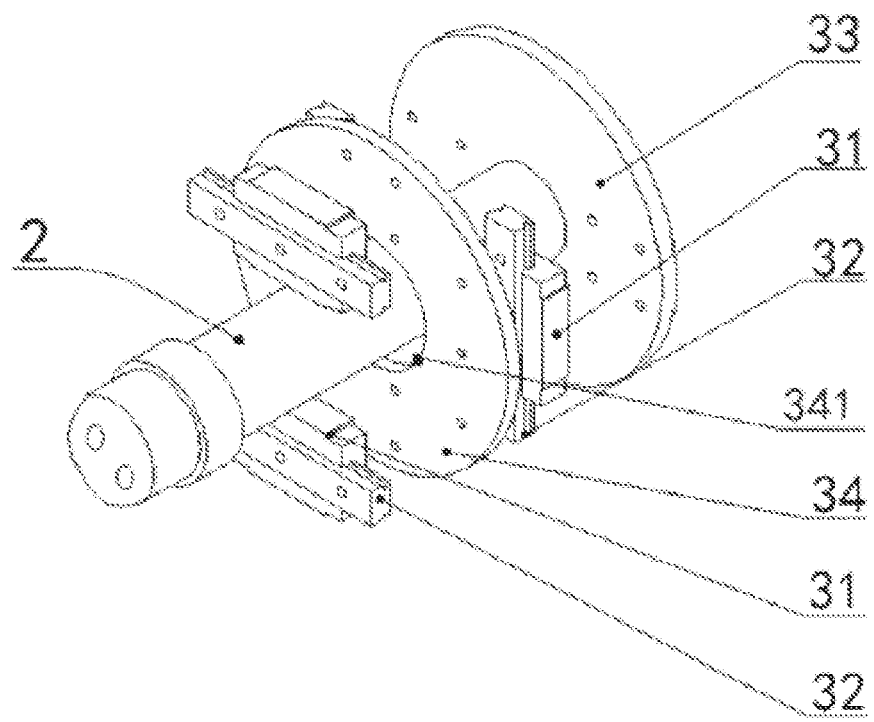
FIG. 3 is a schematic perspective view of the structure of a sliding assembly of the rotating arc sensor according to Embodiment 1 of the present disclosure.
Figure 4:
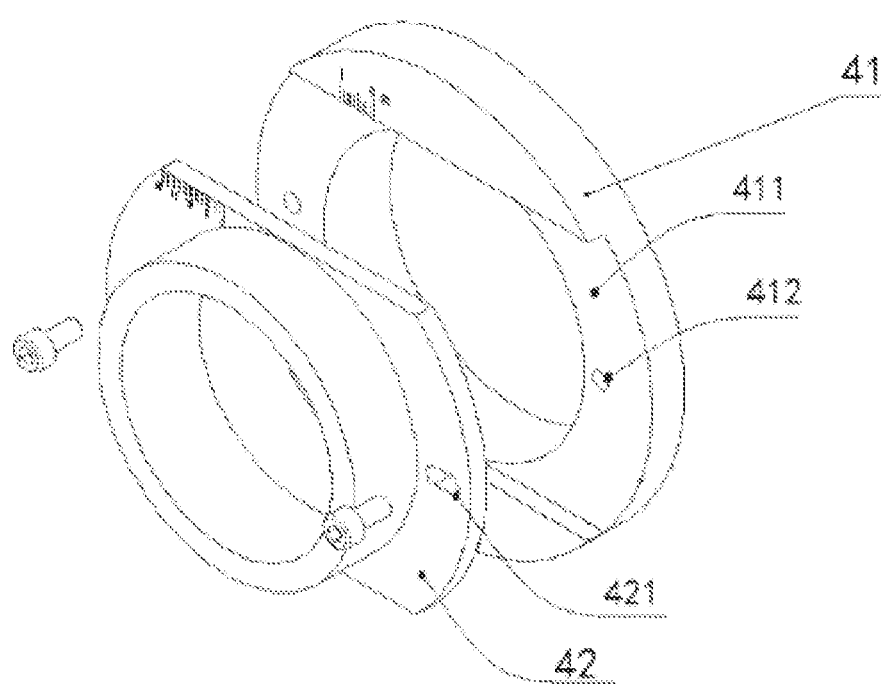
FIG. 4 is a schematic exploded view of an eccentric oscillating member of the rotating arc sensor according to Embodiment 1 of the present disclosure.

As shown in FIG. 1 to FIG. 4, a rotating arc sensor according to the embodiment includes a motor 1, a connecting rod 2 for driving a welding gun 7 to perform an annular movement, a sliding assembly 3 for supporting the weight of the connecting rod 2 and supporting a free movement of one end of the connecting rod 2 in a same horizontal plane, and an oscillating member 4 for driving another end of the connecting rod 2 to perform an annular movement. Specifically, the center of the rotating shaft 11 of the motor 1 is provided with a hollow cavity capable of communicating with both ends of the motor 1, an end of the rotating shaft 11 is provided with a magnetic ring 12, the magnetic ring 12 rotates together with the rotating shaft 11, and the motor 1 is provided therein with an encoder 13 for reading the rotational data of the magnetic ring 12 and connected with a controller of the arc sensor. The sliding assembly 3 is disposed at a top end of the motor 1, and one end of the connecting rod 2 protrudes out of the top end of the motor 1 through the hollow cavity 111 and is connected with the sliding assembly 3. The eccentric oscillating member 4 includes a first flange 41 and a second flange 42. The first flange 41 is sleeved over the rotating shaft of the motor 1 and rotates with the rotating shaft. The second flange 42 is disposed on the first flange 41 and the circle center of the second flange 42 is offset from the circle center of the first flange 41. The other end of the connecting rod 2 extends into the second flange 42 and is connected with an inner wall of the second flange 42 through a bearing assembly. The bearing assembly includes a bearing 5 and a bearing sleeve 6, an inner ring of the bearing 5 is sleeved over another end of the connecting rod 2 with no gap therebetween, an outer ring of the bearing 5 cooperates with an inner wall of the bearing sleeve 6 through interference fit, the inner wall of the bearing sleeve 6 is provided with a retainer ring 61 for limiting the position of the bearing 5, and an outer wall of the bearing sleeve 6 cooperates with an inner wall of the second flange 42 through interference fit. The other end of the connecting rod 2 is provided with a connection assembly for connecting with the welding gun 7. The connection assembly includes a flange 21 and a clamping member 22, both ends of the flange 21 are respectively connected with the other end of the connecting rod 2 and an end of the clamping member 22, and the welding gun 7 is disposed at the other end of the clamping member 22.

During automatic welding, an arm of a robot clamps the motor 1 via a clamping device 8 and drives the rotating arc sensor of the present embodiment to move along a welding seam. Meanwhile, the rotating shaft 11 of the motor 1 drives the first flange 41 of the eccentric-oscillating member 4 to perform a rotating movement. Since the circle center of the second flange 42 is offset from the circle center of the first flange 41, the second flange 42 drives another end of the connecting rod 2 and the welding gun 7 to perform an annular oscillating movement. At the same time, the sliding assembly 3 supports the weights of the connecting rod 2 and the welding gun 7, and supports a free movement of the connecting rod 2. As such, the welding gun 7 can be detachably disposed outside the arc sensor on the basis of ensuring the precise movement trajectory of the welding gun 7, which facilitates convenient maintenance and replacement of the welding gun 7.

Preferably, the sliding assembly 3 includes two sets of sliders 31, two sets of slide rails 32, a first mounting disc 33 and a second mounting disc 34, wherein the two sets of sliders 31 are arranged at lower surfaces of the first mounting disc 33 and the second mounting disc 34 respectively in a "cross" shape, the two sets of slide rails 32 are arranged at upper surfaces of the second mounting disc 34 and the top end of the motor 1 respectively in a "cross" shape and cooperate with the two sets of sliders 31, the first mounting disc 33 is connected with an end of the connecting rod 2, and the first mounting disc 33 and the second mounting disc 34 are disposed apart from each other in the vertical direction. The circle center of the second mounting disc 34 is provided with a circular hole 341, and a spacing is preset between the circular hole 341 and the connecting rod 2 to enable the free movement of the connecting rod 2. When the eccentric oscillating member 4 exerts a torsional force at another end of the connecting rod 2 for the annular movement, an end of the connecting rod 2 simultaneously move in X and Y direction of a same plane accordingly, and the sliders and slide rails each in "cross" shape arrangement realize the following effect: an end of the connecting rod 2 moves freely according to the force exerted thereon by the oscillating member 4.

More preferably, both the sliders 31 and the slide rails 32 are existing standard elements. That is, the slider 31 is provided with a "C" shaped opening, and the two sides of the slide rail 32 are provided with grooves, into which both ends of the "C" shaped opening can extend.

Even more preferably, in order to ensure cleaning and protection of the components of the sliding assembly 3 and the motor 1, a protective cover 14 is provided at the top of the motor 1.

Preferably, the second flange 42 is adjustably disposed on the first flange 41. A surface of the first flange 41 for contacting the second flange 42 is provided with a groove region 411, and an end of the second flange 42 is disposed in the groove region 411 and can slide in the groove region 411 along a wall surface of the groove region 411. The groove region 411 is provided therein with a circular threaded hole 412 for fixing the second flange 42 in cooperation with a bolt, and an end of the second flange 42 is provided with a waist hole 421 corresponding to the circular threaded hole 412. The eccentricity is adjusted through the gap between the waist hole 421 of the second flange 42 and the bolt.

Furthermore preferably, an eccentricity graduated scale is further disposed on the surface of the first flange 41 for contacting the second flange 42, and an end of the second flange 42 is provided with scribed lines for indicating the current eccentricity, thereby achieving further precise adjustment.

While the present disclosure is described in detail with reference to the specific embodiments and general description above, it is apparent to those skilled in the art that some modifications or improvements may be made on the basis of the present disclosure. Therefore, such modifications or improvements made without departing from the spirit of the present disclosure will all fall within the scope of protection of the present disclosure.

What is claimed is:

1. A rotating arc sensor, comprising:
   a motor,
   a connecting rod for driving a welding gun to perform an annular movement,
   a first assembly for supporting a weight of the connecting rod and supporting a free movement of a first end of the connecting rod, and
   an oscillating member for driving a second end of the connecting rod to perform the annular movement, wherein
   a center of a rotating shaft of the motor is provided with a hollow cavity configured for communicating with both ends of the motor,
   the first assembly is disposed at a top end of the motor, and
   the first end of the connecting rod protrudes out of the top end of the motor through the hollow cavity and is connected with the first assembly;
   the oscillating member comprises a first flange and a second flange, wherein the first flange is sleeved over the rotating shaft of the motor and rotates with the rotating shaft, the second flange is disposed on the first flange, and a circle center of the second flange is offset from a circle center of the first flange;
   the second end of the connecting rod extends into the second flange and is connected with an inner wall of the second flange through a bearing assembly, and
   the second end of the connecting rod is provided with a second assembly for connecting with the welding gun,
   the first assembly comprises two sets of sliders, two sets of slide rails, a first mounting disc and a second mounting disc, wherein,
   the two sets of sliders are crosswise arranged at lower surfaces of the first mounting disc and the second mounting disc respectively,
   the two sets of slide rails are crosswise arranged at upper surfaces of the second mounting disc and the top end of the motor respectively and cooperate with the two sets of sliders,
   the first mounting disc is connected with the first end of the connecting rod, and
   the first mounting disc and the second mounting disc are disposed apart from each other in a vertical direction.

2. The rotating arc sensor according to claim 1, wherein a circle center of the second mounting disc is provided with a circular hole, and a spacing is preset between the circular hole and the connecting rod to enable the free movement of the connecting rod.

3. The rotating arc sensor according to claim 1, wherein a slider of the two sets of sliders is provided with a "C" shaped opening, and two sides of a slide rail of the two sets of slide rails are provided with grooves, wherein both ends of the "C" shaped opening extend into the grooves.

4. The rotating arc sensor according to claim 1, wherein the second flange is adjustably disposed on the first flange.

5. The rotating arc sensor according to claim 4, wherein a surface of the first flange for contacting the second flange is provided with a groove region, and an end of the second flange is disposed in the groove region and slides in the groove region along a wall surface of the groove region.

6. The rotating arc sensor according to claim 5, wherein the groove region is provided with a circular threaded hole for fixing the second flange in cooperation with a bolt, and the end of the second flange is provided with a waist hole corresponding to the circular threaded hole.

7. The rotating arc sensor according to claim 5, wherein an eccentricity graduated scale is further disposed on the surface of the first flange for contacting the second flange, and the end of the second flange is provided with scribed lines for indicating a current eccentricity.

8. The rotating arc sensor according to claim 1, wherein the bearing assembly comprises a bearing and a bearing sleeve, an inner ring of the bearing is sleeved over the second end of the connecting rod, an outer ring of the bearing cooperates with an inner wall of the bearing sleeve through an interference fit, and an outer wall of the bearing sleeve cooperates with the inner wall of the second flange through the interference fit.

9. The rotating arc sensor according to claim 1, wherein an end of the rotating shaft is provided with a magnetic ring, the magnetic ring rotates together with the rotating shaft, and the motor is provided with an encoder for reading rotational data of the magnetic ring.

\* \* \* \* \*